(12) United States Patent
Grisoni

(10) Patent No.: US 11,148,976 B2
(45) Date of Patent: Oct. 19, 2021

(54) MORTAR COMPOSITION

(71) Applicant: SIKA TECHNOLOGY AG, Baar (CH)

(72) Inventor: Luca Grisoni, Como (IT)

(73) Assignee: SIKA TECHNOLOGY AG, Baar (CH)

(*) Notice: Subject to any disclaimer, the term of this patent is extended or adjusted under 35 U.S.C. 154(b) by 0 days.

(21) Appl. No.: 15/625,305

(22) Filed: Jun. 16, 2017

(65) Prior Publication Data

US 2017/0283332 A1 Oct. 5, 2017

Related U.S. Application Data

(62) Division of application No. 14/417,030, filed as application No. PCT/EP2013/064653 on Jul. 11, 2013, now abandoned.

(30) Foreign Application Priority Data

Jul. 26, 2012 (EP) .................................. 12178001

(51) Int. Cl.
| | |
|---|---|
| *C04B 28/06* | (2006.01) |
| *C04B 28/02* | (2006.01) |
| *C04B 103/00* | (2006.01) |
| *C04B 111/00* | (2006.01) |
| *C04B 111/52* | (2006.01) |
| *C04B 111/62* | (2006.01) |

(52) U.S. Cl.
CPC ............ *C04B 28/065* (2013.01); *C04B 28/02* (2013.01); *C04B 28/06* (2013.01); *C04B 2103/0053* (2013.01); *C04B 2103/0057* (2013.01); *C04B 2103/0065* (2013.01); *C04B 2111/00603* (2013.01); *C04B 2111/00612* (2013.01); *C04B 2111/52* (2013.01); *C04B 2111/62* (2013.01); *Y02W 30/91* (2015.05)

(58) Field of Classification Search
CPC .................................................. C04B 28/065
See application file for complete search history.

(56) References Cited

U.S. PATENT DOCUMENTS

| | | | | |
|---|---|---|---|---|
| 5,506,046 | A * | 4/1996 | Andersen ................... | C08L 1/28 |
| | | | | 428/34.5 |
| 6,379,454 | B1 | 4/2002 | Fellert | |
| 2004/0204516 | A1* | 10/2004 | DeFord ................... | C04B 28/04 |
| | | | | 524/2 |
| 2005/0092209 | A1* | 5/2005 | Garner ................... | C04B 28/02 |
| | | | | 106/698 |
| 2009/0011207 | A1* | 1/2009 | Dubey ................... | C04B 28/04 |
| | | | | 428/219 |
| 2013/0118381 | A1* | 5/2013 | Frenkenberger ........ | C04B 28/16 |
| | | | | 106/695 |
| 2013/0122267 | A1* | 5/2013 | Riman ................... | C04B 14/043 |
| | | | | 428/201 |
| 2013/0183448 | A1* | 7/2013 | Herold ................... | C04B 28/02 |
| | | | | 427/358 |
| 2017/0283332 | A1 | 10/2017 | Grisoni | |

FOREIGN PATENT DOCUMENTS

| | | | |
|---|---|---|---|
| CN | 101648794 A | 2/2010 | |
| CN | 101696099 A | 4/2010 | |
| DE | 10 2010 041293 A1 | 3/2012 | |
| DE | 102010041293 A1 * | 3/2012 | ............ C04B 28/02 |
| EP | 2877435 | 6/2015 | |
| JP | S5270533 A | 6/1977 | |
| RU | 2133236 C1 | 7/1999 | |
| WO | 2011/015508 A1 | 2/2011 | |
| WO | WO-2011015508 A1 * | 2/2011 | ............ C04B 18/22 |
| WO | 2014/016131 A1 | 1/2014 | |

OTHER PUBLICATIONS

Dec. 20, 2013 International Search Report issued in International Application No. PCT/EP2013/064653.
Dec. 20, 2013 Written Opinion of the International Searching Authority issued in International Application No. PCT/EP2013/064653.
Jan. 25, 2016 Office Action issued in Chinese Patent Application No. 201380038947.5.
Apr. 14, 2016 Office Action Issued in U.S. Appl. No. 14/417,030.
Sep. 22, 2016 Office Action Issued in U.S. Appl. No. 14/417,030.
English Machine Translation CN101648794A. Obtained Sep. 14, 2016 at http://translationportal.epo.org/emtp/translate/?Action=description-retrieval&Country+CN&Engine+Google&FORMAT=docdb&KIND=A&LOCALE=en_EP&NUMBER=101648794&OPS=ops.epo.org/3.1&SRCLANG=zh&TRGLANG=en.
Oct. 14, 2016 Office Action issued in Chinese Patent Application No. 201380038947.5.
Apr. 14, 2017 Office Action issued in Chinese Application No. 201380038947.5.
Optibent MF Product Data Sheet, Obtained Apr. 7, 2016 at https://www.byk.com/en/additives/additives-by-name/optibent-mf.php.
Optibent MF Material Safety and Data Sheet, Obtained Apr. 7, 2016 at https://www.byk.com/en/additives/additives-by-name/optibent-mf.php.
Definition of Bentonite, Obtained Apr. 7, 2016 at http://www.thefreedictionary.com/bentonite.
May 9, 2017 Office Action issued in Japanese Application No. 2015-523482.
Sep. 25, 2018 Office Action issued in European Application No. 13 735 286.0.
Sep. 26, 2019 Office Action issued in Canadian Patent Application No. 2,879,587.
May 11, 2020 Office Action issued in European Patent Application No. 13 735 286.0.
May 26, 2020 Office Action issued in Canadian Patent Application No. 2,879,587.

* cited by examiner

*Primary Examiner* — Arrie L Reuther
(74) *Attorney, Agent, or Firm* — Oliff PLC

(57) ABSTRACT

A mortar composition, in particular for preparing a viscoelastic body or structure, or for acoustic damping of at least one of a ship, an offshore installation and a building, includes:
   1-20 wt % of a hydraulic binder,
   30-80 wt % of aggregates,
   5-75 wt % of a polymer, and
   0.5-40 wt % of a porous filler.

16 Claims, No Drawings

MORTAR COMPOSITION

TECHNICAL FIELD

The invention relates to a mortar composition, in particular for preparing viscoelastic bodies or structures. Another object of the invention is a shaped body comprising the mortar composition after hardening with water and a structure, in particular a floor, a wall or a ceiling, comprising the shaped body. Moreover the invention relates to a method for producing of the structure as well as to the use of the mortar composition and the shaped body.

BACKGROUND ART

In buildings, ships or cars, the transmission of undesired sound or vibrations trough structural elements, floors, walls or ceilings is a challenging problem. This is in particular true for steel based constructions, such as e.g. ships and offshore installations, with large flat areas.

As a consequence, flat areas such as floors are not only expected to be smooth and level, but to play a major part in noise and vibration suppression. On board ships, there are several dominant sound and vibration sources like diesel engines, gearboxes and propellers that transmit these kinds of energy. In the domain of acoustic and vibration engineering, the energy released by these sources are defined in two ways:

Vibration: Dynamic movements in solids and liquids
Sound: Variations in air pressure in the audible frequency range (20 Hz-20 kHz)

On a vessel, the most dominant transmission of undesirable sound or noise is through the structure of the vessel. The engine, the propeller, the gearbox etc. each creates energy waves that transmit as structure-borne noise into the air from the large flat areas, such as e.g. decks and bulkheads, that act as sounding boards.

Airborne noise is less dominant as sounds carried along companionways and laterally through partitions and bulkheads reduce substantially with the distance from the source.

In order to reduce vibrations and noise, viscoelastic damping systems can be applied directly onto vibrating areas or surfaces. These systems will reduce the radiation of low frequency noise and transform the vibrations from kinetic energy into heat.

Several viscoelastic damping systems are commercially available. A highly efficient system consists of a thin two-component polyurethane layer which is directly laid on a support surface to be damped (e.g. a deck surface made of steel or aluminum) and a constraining layer (e.g. a mortar based layer or steel tiles) put on top of the polyurethane layer. Within this system, the polyurethane layer functions as viscoelastic dampening element as well as a primer between the metal surface and the constraining layer.

Although such viscoelastic damping systems have a significant dampening effect, polyurethane layers may not always be suitable for specific applications.

There is thus a need to develop alternative acoustic damping systems, which overcome the aforementioned drawbacks.

DISCLOSURE OF THE INVENTION

It is an object of the present invention to provide an advantageous acoustic damping element. In particular the damping element should absorb noise in the frequency range of 5-600 Hz. The damping element should in particular be suitable for marine applications. Moreover, the damping element should preferably be free of isocyanates and corrosive compounds. Preferably, the damping element should additionally have good adhesion to different kind of materials, in particular to mortar, concrete and metals, such as e.g. steel, aluminum and zinc. As well, the damping element should be safe and easy to produce and use. Also, the damping element should preferably be applicable using standard equipment and should be self-levelling.

Surprisingly, it has been found that these objects are achieved by the features of claim 1. Thus, the core of the invention is a mortar composition, in particular for preparing a viscoelastic structure and/or acoustic damping element, comprising or consisting of:
  a) 1-20 wt.-% of a hydraulic binder,
  b) 30-80 wt.-% of aggregates,
  c) 5-75 wt.-% of a polymer, and
  d) 0.5-40 wt.-% of a layered material.

Such mortar composition can be used to produce advantageous viscoelastic structures or acoustic damping elements which are capable of absorbing noise in the frequency range of 5-600 Hz, e.g. in marine applications, without the need of any isocyanate based materials or corrosive compounds.

Producing such elements or structures is quite easy and safe: The mortar composition, in particular in dry state, is mixed with an appropriate amount of water. After hardening of the mortar composition, the viscoelastic structure or acoustic damping element is ready. Furthermore, the mortar composition itself can be a one-component mixture. This will exclude the risk of a mix up or wrong dosing of individual components by users.

As could be shown, the mortar compositions or the viscoelastic structures made thereof feature good adhesion to different kind of materials, in particular to mortar, concrete and metals, such as e.g. steel, aluminum and zinc. Therefore, the viscoelastic structures or acoustic damping elements made from the inventive mortar compositions are highly compatible with elements of existing damping systems, such as e.g. existing constraining layers.

Additional aspects of the invention are subject of further independent claims. Particularly preferred embodiments are outlined throughout the description and the dependent claims.

Ways of Carrying Out the Invention

In the present context, the expression "hydraulic binder" in particular stands for substances that harden because of hydration chemical reactions producing hydrates. Preferably the hydrates produced are not water-soluble. In particular, the hydration chemical reactions of the hydraulic binder takes essentially place independently of the water content. This means that the hydraulic binder can harden and retain its strength even when exposed to water, e.g. underwater or under high humidity conditions.

The term "layered material" stands in particular for a material with a layered crystal structure. Especially, the layered material is a plate-like material. A plate-like material is in particular a material with a length and width larger than its thickness.

A first aspect of the invention relates to a mortar composition, in particular for preparing a viscoelastic structure and/or acoustic damping element, comprising or consisting of:
  a) 1-20 wt.-% of a hydraulic binder,
  b) 30-80 wt.-% of aggregates,
  c) 5-75 wt.-% of a polymer, and
  d) 0.5-40 wt.-% of a layered material.

In particular, all the amounts are with respect to the total weight of the mortar composition.

Especially, the mortar composition is a dry mortar composition. This means that the mortar composition is essentially free of water or an amount of water is below 1 wt.-%, in particular below 0.5 wt.-% or below 0.1 wt.-%, with respect to the total weight of the mortar composition. Preferably, the polymer is present in solid state, especially as a powder.

According to a preferred embodiment, the mortar composition is a one-component mixture. That means that all the individual materials and/or substances are intermixed. One-component compositions are in particular easy to handle and exclude the risk of a mix up or wrong dosing of individual components by users.

However, it is in principle possible to provide a two-component mortar composition or even a multi-component mortar composition. A first component may e.g. be present in a first receptacle comprising the hydraulic binder, the polymer and the layered material. A second component, present in a second receptacle, may comprise the aggregates. Other distributions are possible as well. Two- or multi-component mortar compositions allow e.g. for adjusting the mortar composition with regard to specific applications.

Preferably, the hydraulic binder comprises or consists of cement. Preferably the cement is Portland cement and/or alumina cement and/or sulphoaluminate cement. Mixtures of Portland cement and aluminum cement are possible as well. Preferred Portland cement is according to norm EN 197, in particular of type CEM I. The term "alumina cement" stands in particular for a cement with an aluminum content, measured as $Al_2O_3$, of at least 30 wt.-%, especially at least 35 wt.-%, in particular 35-58 wt.-%. Preferably, the alumina cement is alumina cement according to standard EN 14647.

Alumina cements have been proven to be especially advantageous in the present context.

Moreover, the hydraulic binder can optionally comprise or consist of latent hydraulic and/or pozzolanic binder materials. The term "latent hydraulic and/or pozzolanic binder materials" stands in particular for type II concrete additives with latent hydraulic and/or pozzolanic character according to EN 206-1. In particular, the latent hydraulic or pozzolanic binder material comprises or consists of slag, fly ash, silica fume, metacaolin and/or natural pozzolanes.

According to a further preferred embodiment, the hydraulic binder comprises or consists of 10-95 wt. % of hydraulic binder, in particular Portland cement and/or alumina cement, and 90-5 wt. % of latent hydraulic and/or pozzolanic binder material. More preferably, the binder composition comprises or consists of 30-90 wt. % of hydraulic binder and 70-10 wt. % of latent hydraulic and/or pozzolanic binder material.

A preferred amount of hydraulic binder is 2-15 wt.-%, in particular 3-10 wt.-%, especially 3-6 wt.-%, with respect to the total weight of the mortar composition.

Preferred aggregates are selected from sand, quartz, calcium carbonate, natural river sand, basalt, metallic aggregates, and or rubber. The grain size of the aggregates is preferably at most 4 mm, in particular at most 2 mm, especially at most 1 mm. However, other aggregates may be used as well for specific purposes.

In particular, an amount of the aggregates is 40-70 wt.-%, in particular 45-65 wt.-%, especially 50-60 wt.-%, with respect to with respect to the total weight of the mortar composition.

Preferably, the polymer is a water soluble or water redispersible polymer, in particular a water soluble polymer. Such polymers have proven to be beneficial in the present mortar compositions. However, e.g. for specific purposes, other polymers might be suitable as well.

Especially, the polymer is used to control the acoustic properties and/or damping, e.g. the acoustic temperature range, of the mortar composition and/or a shaped body made thereof. In particular, the polymer has a glass transition temperature of −40-110° C., in particular 0-90° C., especially 15-40° C. Such polymers improve the viscoelastic properties of hardened mortar compositions further.

In particular, the glass transition temperature of the polymer is used to control the acoustic properties and/or damping, e.g. the acoustic temperature range, of the mortar composition and/or a shaped body made thereof.

Especially, the polymer is a homopolymer or copolymer based on one or more monomers selected from vinyl acetate, vinyl alcohol, acrylic acid, acrylate, methacrylic acid, methacrylate and ethylene.

Preferably, the polymer is selected from polyvinyl esters, polyvinyl alcohols, polyacrylates, polymethacrylates, butylacrylates, vinynilversatate or mixtures thereof. Especially, the polymer is selected from polyacrylate, poly(vinyl acetate), poly(vinyl alcohol), ethylene-vinyl acetate copolymer, ethylene-vinyl alcohol copolymer or mixtures thereof.

However, other water-soluble polymers might be suitable as well.

A preferred amount of the polymer is 10-50 wt.-%, in particular 15-40 wt.-%, especially 25-35 wt.-%, with respect to the total weight of the mortar composition. According to a preferred embodiment, the layered material is a layered mineral. Preferably, the layered material is selected from clay and/or mica. Within the context of this invention, "clay" stands in particular for phyllosilicates and/or sheet silicates. Especially preferred, the layered material comprises or consists of vermiculite.

In particular, a grain size of the layered material is 4 mm at most, preferably 2 mm at most, especially 1 mm at most.

A preferred amount of layered material is 1-25 wt.-%, in particular 2-10 wt.-%, especially 4-10 wt.-%, especially preferred 5-10 wt.-%, with respect to the total weight of the mortar composition.

In a further preferred embodiment, the mortar composition additionally comprises a porous filler. In particular, the porous filler has a porosity of at least 25 vol.-%, especially at least 50 vol.-%, in particular at least 75 vol.-%, with respect to the total volume of the porous filler. Especially, the porous filler comprises volcanic rock. Advantageously, the porous filler comprises or consists of pumice and/or perlite.

However, the porous filler may also comprise cork and/or recycled materials. In particular, a grain size of the porous filler is 4 mm at most, preferably 2 mm at most, especially 1 mm at most.

A preferred amount of the porous filler is 0.5-40 wt.-%, especially 1-25 wt.-%, in particular 2-6 wt.-%, with respect to the total weight of the mortar composition.

Furthermore, it can be beneficial if the mortar composition comprises a thixotropic agent, in particular silica, silica fume, cellulose, and/or saccharides.

According to another preferred embodiment, the mortar composition comprises a plasticizer, whereby the plasticizer is in particular selected from the group of lignosulfonates, gluconates, naphtalenesulfonates, melamine sulfonates, vinyl copolymers and/or polycarboxylates. Polycarboxylate ethers are preferred.

In particular, the plasticizer is chemically different from the above mentioned polymer.

An especially preferred mortar composition comprises or consists of:
- a) 1-20 wt.-%, especially 2-15 wt.-%, of hydraulic binder, whereby the hydraulic binder comprises cement, in particular alumina cement,
- b) 30-80 wt.-%, especially 40-70 wt.-%, of aggregates selected from sand and/or quartz,
- c) 5-75 wt.-%, especially 10-50 wt.-%, of polymer, whereby the polymer is selected from polyacrylate, poly(vinyl acetate), poly(vinyl alcohol), ethylene-vinyl acetate copolymer and ethylene-vinyl alcohol copolymer or mixtures thereof.
- d) 0.5-40 wt.-%, especially 1-25 wt.-%, of layered material selected from clay and/or mica, in particular vermiculite, and
- e) optionally, 0.5-40 wt.-%, especially 1-25 wt.-%, of a porous filler, selected from pumice and/or perlite.

Another aspect of the present invention relates to a shaped body, in particular a flat layer, comprising a hardened mortar composition. The hardened mortar composition is a mortar composition as defined above after hardening with water. Put differently, the hardened mortar composition is obtainable by mixing water with a mortar composition as defined above.

A preferred weight ratio of water to the mortar composition is 0.15-0.7, especially 0.3-0.5.

In particular, the shaped body features viscoelastic properties. This means that the shaped body exhibits a phase lag between strain and corresponding stress resulting in the ability to store and dissipate energy at the same time. This is in contrast to e.g. elastic bodies where stress and strain remain in phase.

In particular, the shaped body is a flat layer, in particular with a thickness of 0.5-10 mm, preferably 1-5 mm. Within the present context, a flat layer is in particular a body with a width and a length larger than its thickness.

A tensile strength of the shaped body according to standard ISO 37 is preferably at least 0.3 N/mm$^2$, in particular at least 0.7 N/mm$^2$, preferably at least 1 N/mm$^2$.

An advantageous elongation at break of the shaped body according to standard ISO 37 is at least 10%, in particular at least 25%, preferably at least 40%, especially at least 50%.

Preferably, for the mechanical measurements a tensile tester according to DIN EN ISO 7500-1 part 1 is used.

A loss factor tan δ of the shaped body according to standard ISO 6721 at 0° C. and 300 Hz is preferably at least 0.05, especially at least 0.1, in particular at least 0.12, in particular preferred at least 0.13.

Shaped bodies with the above mentioned properties are especially suitable for viscoelastic structures or acoustic damping elements.

A further aspect of the present invention relates to a structure, in particular a floor, a wall or a ceiling, comprising the above described shaped body. Preferably, a support element and/or a cover element is attached to the shaped body. The cover element can e.g. be a constraining layer.

Especially, the shaped body is arranged between the support element and the cover element. In this configuration, the shaped body is constrained between the support element and the cover element.

In particular, the support element is a metal layer, in particular made of steel and/or aluminum. A preferred cover element is formed as flat layer. Especially, the cover element is a cement based layer, e.g. a mortar layer. In this case, the cement based layer is different from the shaped body and/or the mortar composition of the present invention.

Optionally, it is possible to have a primer between the support element and the shaped body. This might further increase the adhesion between the support element and the shaped body.

Another aspect of the present invention relates to a method for the production of a structure, whereby the mortar composition of the present invention is mixed with water, applied on a support structure and covered with a cover element. Thereby, the support structure and the cover element are defined as described above.

Especially, the mortar composition is applied with a thickness of 1-5 mm.

According to a preferred embodiment, the support element is a metal layer, in particular made of steel and/or aluminum. A preferred cover element is formed as flat layer. Especially, the cover element is a cement based layer, e.g. a mortar layer.

An additional aspect of the present invention relates to the use of the mortar composition and the shaped body as herein described. Especially, the mortar composition and/or the shaped body is used for acoustic damping.

According to a preferred embodiment, the mortar composition and/or the shaped body is used for acoustic damping in a ship, an offshore installation, a vehicle and/or in a building, in particular in a ship or in an offshore installation.

Especially preferred, the mortar composition and/or the shaped body is used for acoustic damping on a floor, on a wall and/or on a ceiling, preferably on a floor.

Preferably, the acoustic properties and/or damping, e.g. the acoustic temperature range, of the mortar composition and/or the shaped body is controlled with the polymer, in particular with the glass transition temperature of the polymer.

Moreover, the mortar composition and/or the shaped body can be used as an underlay and/or primer for a cover element on a support structure.

Further preferred, the mortar composition and/or the shaped body is used for increasing adhesion between the support structure and the cover element.

Thereby, the cover element is preferably a mortar layer and/or the support structure is preferably a metal layer, in particular made of steel and/or aluminum.

Further advantageous configurations of the invention are evident from the exemplary embodiments.

EXEMPLARY EMBODIMENTS

1. Mortar Compositions

Table 1 shows three inventive mortar compositions M1-M3. The mortar compositions have been prepared by intermixing all of the components in dry state. The mortar composition M1-M3 are present as dry powders.

TABLE 1

| Component | M1 | M2 | M3 |
|---|---|---|---|
| Hydraulic binder [wt-%] | | | |
| Aluminum cement[1) ] | 5 | 5 | 8 |
| Aggregate [wt-%] | | | |
| Sand (0-1 mm) | 53 | 61 | 56 |
| Polymer [wt-%] | | | |
| Ethylene-vinyl acetate copolymer[2)] | 30 | 0 | 0 |

TABLE 1-continued

| Component | M1 | M2 | M3 |
|---|---|---|---|
| Ethylene-vinyl acetate copolymer[3] Layered Material [wt-%] | 0 | 30 | 30 |
| Vermiculite[4] Porous filler [wt-%] | 8 | 4 | 3 |
| Pumice[5] | 4 | 0 | 3 |

[1]Isidac 40, available from Cimsa, Turkey
[2]FX 2322, available from AkzoNobel/Elotex, Switzerland
[3]Vinnapas 7055, available from Wacker, Germany
[4]Grain size <2 mm
[5]Rotocell 0.25-0.5 (grain size 0.25-0.5 mm), available from Rotec, Germany 2. Mortar Properties Mortar compositions M1-M3 have been mixed with water (weight ratio of water to total weight of dry mortar composition=0.3)

Flow table spread values were assessed according standard EN 12350-5. Directly after preparation values in the range of 250-300 mm were obtained. Thus, the mortar compositions show a flow behavior which makes processing easy and allows for self-leveling of the mortars.

Additionally, the acoustic properties of hardened mortar compositions have been tested as well.

The loss factor tan δ has been determined according to standard ISO 6721 in a known manner with an Oberst bar. Table 2 shows an overview of the properties of mortar composition M1-M3. For comparison, a commercially available reference system (Ref.) has been tested as well. The reference system is SikaFloor® Marine PU-Red (available from Sika Denmark) which is a two component polyurethane damping compound.

TABLE 2

| Mortar composition | Loss factor (tan δ)[1] |
|---|---|
| M1 | 0.14 |
| M2 | 0.12 |
| M3 | 0.07 |
| Ref. | 0.17 |

[1]measured at 0° C. and 300 Hz

As can be deduce from table 2, all of the mortar compositions feature a loss factor >0.05. Thus, all the mortar compositions show viscoelastic properties. The loss factor of mortar composition M1 is very close to the loss factor of the reference system (Ref.).

3. Application

Mortar composition M1 has been applied with a thickness of 2 mm on a cleaned flat steel plate. After hardening for 24 hours, a commercially available cement based constraining layer (SikaFloor®-Marine 18, a mortar composition comprising cement and sand) has been applied.

For reason of comparison, a similar system has been prepared with 2 mm SikaFloor® Marine PU-Red (polyurethane based layer) instead of the mortar composition M1.

With regard to adhesion between individual layers and acoustic dampening, the mortar based structure was found comparable to the polyurethane based structure.

Thus, mortar compositions according to the present invention can indeed be used as replacements for known polyurethane systems.

Thus, it will be appreciated by those skilled in the art that the present invention can be embodied in other specific forms without departing from the spirit or essential characteristics thereof. The presently disclosed embodiments are therefore considered in all respects to be illustrative and not restricted.

The invention claimed is:

1. A method for the acoustic damping in a ship, an offshore installation, a vehicle and/or in a building, said method comprising the steps of:
    producing a structure comprising:
        a shaped body comprising a mortar composition after hardening with water, the shaped body having a loss factor tan δ according to standard ISO 6721 at 0° C. and 300 Hz of at least 0.05, wherein
            the hardened mortar composition of the shaped body is configured for acoustic damping of the ship, the offshore installation, the vehicle and/or the building, and
            the mortar composition comprises:
                3-10 wt % of a hydraulic binder,
                30-80 wt % of aggregates,
                25-35 wt % of a polymer, and
                2-6 wt % of a porous filler, wherein
                    the porous filler comprises volcanic rock, and
                    the porous filler has a porosity of at least 25 vol % and a grain size of the porous filler is 4 mm or less; and
        a support element and cover element being attached to the shaped body; wherein
    the shaped body comprising the hardened mortar composition is formed by mixing the mortar composition with water, applying the mixture on a support structure and covering the mixture with a covering layer, and wherein the mortar composition is applied on a floor, on a wall, and/or on a ceiling.

2. The method according to claim 1, wherein the polymer of the mortar composition is a water soluble or a water redispersible polymer.

3. The method according to claim 1, wherein the polymer of the mortar composition is a homopolymer or copolymer based on one or more monomers selected from the group consisting of vinyl alcohol, acrylic acid, methacrylic acid, and methacrylate.

4. The method according to claim 1, wherein the hydraulic binder of the mortar composition comprises alumina cement.

5. The method according to claim 1, wherein the aggregates of the mortar composition is at least one selected from the group consisting of sand, quartz, and rubber.

6. The method according to claim 1, wherein the shaped body is a flat layer.

7. The method according to claim 1, wherein the loss factor tan δ according to standard ISO 6721 at 0° C. and 300 Hz is at least 0.13.

8. The method according to claim 1, wherein the shaped body is arranged between the support element and the cover element, where the support element is a metal layer, and the cover element is formed as flat layer.

9. The method according to claim 1, wherein the porous filler of the mortar composition is at least one selected from the group consisting of pumice and perlite.

10. The method according to claim 1, wherein the porosity of the porous filler of the mortar composition is at least 50 vol % with respect to the total volume of the porous filler.

11. The method according to claim 10, wherein the porosity of the porous filler of the mortar composition is at least 75 vol % with respect to the total volume of the porous filler.

12. The method according to claim 1, wherein the grain size of the porous filler of the mortar composition is 2 mm or less.

13. The method according to claim 1, wherein the grain size of the porous filler of the mortar composition is 1 mm or less.

14. The method according to claim 1, wherein the polymer is selected from polyvinyl esters, polyvinyl alcohols, polymethacrylates, butylacrylates, vinylversatate or mixtures thereof.

15. The method according to claim 1, wherein polymer is selected from polyacrylate, poly(vinyl acetate), poly(vinyl alcohol), ethylene-vinyl acetate copolymer, ethylene-vinyl alcohol copolymer or mixtures thereof.

16. The method according to claim 1, wherein the mortar composition is applied on the support structure at a thickness in a range of from 1-5 mm.

* * * * *